(12) United States Patent
Hardy et al.

(10) Patent No.: US 11,615,378 B2
(45) Date of Patent: Mar. 28, 2023

(54) REPRESENTING NEW MESSAGES ON A COMMUNICATION DEVICE

(71) Applicant: BlackBerry Limited, Waterloo (CA)

(72) Inventors: Michael Thomas Hardy, Waterloo (CA); Ronald Scotte Zinn, Kitchener (CA); Gerhard Dietrich Klassen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 234 days.

(21) Appl. No.: 15/877,059

(22) Filed: Jan. 22, 2018

(65) Prior Publication Data

US 2018/0144306 A1 May 24, 2018

Related U.S. Application Data (63) Continuation of application No. 13/466,786, filed on May 8, 2012, now Pat. No. 9,892,381, which is a
(Continued)

(51) Int. Cl.
*G06Q 10/10* (2012.01)
*G06Q 10/107* (2023.01)
(Continued)

(52) U.S. Cl.
CPC ......... *G06Q 10/107* (2013.01); *G06F 3/0488* (2013.01); *G06F 3/04812* (2013.01); *H04L 51/04* (2013.01)

(58) Field of Classification Search
CPC ........ G06F 10/107; G06F 9/4443; G06F 8/38; G06F 40/18; G06F 3/04812;
(Continued)

(56) References Cited

U.S. PATENT DOCUMENTS 5,493,284 A * 2/1996 Kondo ................. G08B 3/1066
340/7.52
5,579,472 A 11/1996 Keyworth et al.
(Continued)

FOREIGN PATENT DOCUMENTS

CA 2 503 528 5/2004
CA 2326230 C * 4/2008 ........... H04L 12/589
(Continued)

OTHER PUBLICATIONS

*Blackberry Limited v. Twitter, Inc.*, "Reply Memorandum of Points and Authorities in Further Support of Defendant Twitter, Inc.'s Motion to Dismiss Pursuant to Fed. R. Civ. P. 12(B)(6)," Case No. 2:19-cv-1444, dated Aug. 15, 2019, 37 pages.
(Continued)

*Primary Examiner* — Steven P Sax
(74) *Attorney, Agent, or Firm* — Fish & Richardson P.C.

(57) ABSTRACT

There is provided a method of representing new email messages on a communication device having a display. This method comprises setting a new message flag when an email message is received by the device; and displaying a new message indicator on the display when the new message flag is set. The new message indicator can be displayed on a home screen on the display. The new message flag can be unset when a messages screen is selected on the device. A computer readable memory having recorded thereon instructions to carry out this method is also provided, as well as a device comprising such memory.

11 Claims, 10 Drawing Sheets

Related U.S. Application Data continuation of application No. 11/320,980, filed on Dec. 30, 2005, now Pat. No. 8,286,089.

(51) Int. Cl.
  *G06F 3/04812* (2022.01)
  *G06F 3/0488* (2022.01)
  *H04L 51/04* (2022.01)

(58) Field of Classification Search
  CPC .... G06F 3/0482; G06F 3/0484; G06F 3/0485; G06F 3/0488; G06F 16/9017; G06F 9/547; G06F 9/542; G06F 9/54; H04L 12/581; H04L 51/04; H04L 67/24; H04L 51/24; H04L 51/58; H04L 51/28; H04L 12/1813; H04L 12/589; H04M 1/72552; H04M 1/7243; G06Q 10/107; H04W 88/02; G08B 3/1066; H04N 21/4345
  See application file for complete search history.

(56) References Cited

U.S. PATENT DOCUMENTS

| | | | |
|---|---|---|---|
| 5,617,539 A | 4/1997 | Ludwig et al. | |
| 5,758,079 A | 5/1998 | Ludwig et al. | |
| 5,764,901 A | 6/1998 | Skarbo et al. | |
| 5,835,084 A | 11/1998 | Bailey et al. | |
| 5,867,654 A | 2/1999 | Ludwig et al. | |
| 5,936,548 A | 8/1999 | Takatsuka | |
| 5,966,351 A | 10/1999 | Carleton et al. | |
| 6,037,935 A | 3/2000 | Bates et al. | |
| 6,157,814 A | 12/2000 | Hymel et al. | |
| 6,212,547 B1 | 4/2001 | Ludwig et al. | |
| 6,292,668 B1* | 9/2001 | Alanara | H04W 88/02 455/466 |
| 6,337,699 B1 | 1/2002 | Nielsen | |
| 6,396,509 B1 | 5/2002 | Cheng | |
| 6,396,513 B1 | 5/2002 | Helfman et al. | |
| 6,430,568 B1* | 8/2002 | Hickey | G06F 9/54 715/240 |
| 6,466,654 B1 | 10/2002 | Cooper et al. | |
| 6,489,950 B1 | 12/2002 | Griffen et al. | |
| 6,628,194 B1 | 9/2003 | Hellebust et al. | |
| 6,697,458 B1 | 2/2004 | Kunjibettu | |
| 6,720,863 B2 | 4/2004 | Hull et al. | |
| 6,731,308 B1 | 5/2004 | Tang et al. | |
| 6,741,268 B1 | 5/2004 | Hayakawa | |
| 6,778,069 B1 | 8/2004 | Katagiri | |
| 6,886,030 B1* | 4/2005 | Easterbrook | G06Q 10/107 709/206 |
| 6,965,917 B1 | 11/2005 | Aloni et al. | |
| 6,981,223 B2 | 12/2005 | Becker et al. | |
| 7,085,812 B1 | 8/2006 | Sherwood | |
| 7,185,054 B1 | 2/2007 | Ludwig et al. | |
| 7,212,814 B2 | 5/2007 | Wilson et al. | |
| 7,213,206 B2 | 5/2007 | Fogg | |
| 7,213,210 B2 | 5/2007 | Reysa | |
| 7,234,112 B1 | 6/2007 | Brown et al. | |
| 7,250,955 B1* | 7/2007 | Beeman | G06F 9/542 345/592 |
| 7,281,215 B1 | 10/2007 | Canfield et al. | |
| 7,398,296 B2 | 7/2008 | Ludwig et al. | |
| 7,403,973 B2* | 7/2008 | Wilsher | H04L 51/066 709/206 |
| 7,412,482 B2 | 8/2008 | Ludwig et al. | |
| 7,421,470 B2 | 9/2008 | Ludwig et al. | |
| 7,433,921 B2 | 10/2008 | Ludwig et al. | |
| 7,437,411 B2 | 10/2008 | Ludwig et al. | |
| 7,437,412 B2 | 10/2008 | Ludwig et al. | |
| 7,441,001 B2 | 10/2008 | Ludwig et al. | |
| 7,444,373 B2 | 10/2008 | Ludwig et al. | |
| 7,454,716 B2 | 11/2008 | Venolia | |
| 7,487,210 B2 | 2/2009 | Ludwig et al. | |
| 7,707,244 B2 | 4/2010 | Malik et al. | |
| 7,908,320 B2 | 3/2011 | Ludwig et al. | |
| 7,941,491 B2 | 5/2011 | Sood | |
| 8,209,634 B2 | 6/2012 | Klassen et al. | |
| 8,255,835 B2* | 8/2012 | Booking | G06F 3/0482 715/739 |
| 8,286,089 B2 | 10/2012 | Hardy et al. | |
| 8,296,351 B2 | 10/2012 | Lazaridis et al. | |
| 8,572,182 B2 | 10/2013 | Klassen | |
| 8,676,929 B2 | 3/2014 | Lazaridis et al. | |
| 8,825,777 B2 | 9/2014 | DeLuca et al. | |
| 9,021,059 B2 | 4/2015 | Runstedler et al. | |
| 9,349,120 B2 | 5/2016 | Kalu | |
| 2001/0035881 A1* | 11/2001 | Stoakley | G06F 3/0481 715/772 |
| 2002/0019852 A1 | 2/2002 | Bahar | |
| 2002/0076004 A1 | 6/2002 | Brockenbrough et al. | |
| 2002/0101453 A1* | 8/2002 | Nixon | H04M 3/53 715/810 |
| 2002/0130904 A1 | 9/2002 | Becker et al. | |
| 2002/0160817 A1 | 10/2002 | Salmimaa et al. | |
| 2002/0170040 A1 | 11/2002 | Idan | |
| 2002/0174184 A1* | 11/2002 | Bouchard | H04L 51/24 709/206 |
| 2002/0183044 A1* | 12/2002 | Blackwell | G06Q 10/107 455/466 |
| 2003/0064707 A1 | 4/2003 | Yoneyama | |
| 2004/0021703 A1 | 2/2004 | Watanabe et al. | |
| 2004/0034626 A1* | 2/2004 | Fillingham | G06F 16/9535 |
| 2004/0056893 A1 | 3/2004 | Canfield et al. | |
| 2004/0073605 A1 | 4/2004 | Conley, Jr. | |
| 2004/0155908 A1 | 8/2004 | Wagner | |
| 2004/0155909 A1 | 8/2004 | Wagner | |
| 2004/0236839 A1* | 11/2004 | Wilson | G06F 3/04842 709/207 |
| 2004/0259598 A1 | 12/2004 | Wagner et al. | |
| 2005/0080861 A1* | 4/2005 | Daniell | G06Q 10/107 709/206 |
| 2005/0114458 A1 | 5/2005 | Gottlieb | |
| 2005/0114781 A1 | 5/2005 | Brownholtz et al. | |
| 2005/0138552 A1 | 6/2005 | Venolia | |
| 2005/0188320 A1* | 8/2005 | Bocking | G06F 3/04895 715/752 |
| 2005/0193345 A1 | 9/2005 | Klassen et al. | |
| 2005/0240983 A1 | 10/2005 | Peters | |
| 2005/0248437 A1 | 11/2005 | Hellebust et al. | |
| 2006/0009243 A1* | 1/2006 | Dahan | H04L 51/58 455/466 |
| 2006/0018444 A1 | 1/2006 | Pantana | |
| 2006/0020677 A1 | 1/2006 | von Koch | |
| 2006/0084450 A1 | 4/2006 | Dam Nielsen et al. | |
| 2006/0101351 A1* | 5/2006 | Cowham | G06Q 10/109 715/783 |
| 2006/0200455 A1 | 9/2006 | Wilson | |
| 2006/0238384 A1* | 10/2006 | Hess | H04B 7/18506 340/995.14 |
| 2007/0016849 A1* | 1/2007 | Aureglia | G06F 40/18 715/220 |
| 2007/0038605 A1* | 2/2007 | Gopal | G06Q 10/107 |
| 2007/0038711 A1 | 2/2007 | MacBeth et al. | |
| 2007/0066283 A1* | 3/2007 | Haar | H04M 1/7243 455/412.2 |
| 2007/0156821 A1 | 7/2007 | Hardy et al. | |
| 2007/0195007 A1* | 8/2007 | Bear | G06Q 10/107 345/1.1 |
| 2007/0226168 A1* | 9/2007 | Mukundan | G06F 9/547 |
| 2008/0222127 A1* | 9/2008 | Bergin | G06F 16/9017 707/999.005 |
| 2010/0057875 A1 | 3/2010 | Bychkov et al. | |
| 2010/0287483 A1 | 11/2010 | Smith et al. | |
| 2012/0221660 A1 | 8/2012 | Hardy et al. | |

FOREIGN PATENT DOCUMENTS

| | | | | |
|---|---|---|---|---|
| CN | 100403738 C | * | 7/2008 | ............ H04L 51/38 |
| CN | 100407741 C | * | 7/2008 | |
| CN | 100456749 C | * | 1/2009 | |
| EP | 0 961 447 | | 12/1999 | |

(56) References Cited

FOREIGN PATENT DOCUMENTS

| ES | 2356899 T3 | * | 4/2011 | ........ H04M 1/72519 |
|---|---|---|---|---|
| JP | 2000295648 | | 10/2000 | |
| JP | 2004518184 A | * | 6/2004 | |
| JP | 2004200817 A | * | 7/2004 | ........... H04L 12/587 |
| JP | 2004287598 A | * | 10/2004 | |
| JP | 3586208 B2 | * | 11/2004 | ............. H04L 51/28 |
| JP | 3610718 B2 | * | 1/2005 | ........... G06Q 10/107 |
| JP | 3840110 B2 | * | 11/2006 | ......... H04L 12/1813 |
| JP | 3864251 B2 | * | 12/2006 | ............. G06F 9/542 |
| JP | 3921309 B2 | * | 5/2007 | ...... H04M 1/274516 |
| JP | 4267224 B2 | * | 5/2009 | |
| JP | 4314343 B2 | * | 8/2009 | |
| JP | 4494645 B2 | * | 6/2010 | ......... H04N 21/4345 |
| JP | 4547777 B2 | * | 9/2010 | ........... G06Q 10/107 |
| JP | 4878721 B2 | * | 2/2012 | |
| WO | 1999/043171 | | 8/1999 | |
| WO | 2002/19082 | | 3/2002 | |
| WO | 2005/115035 | | 1/2005 | |

OTHER PUBLICATIONS

*Blackberry Limited* v. *Twitter, Inc.*, "Memorandum of Points and Authorities in Support of Defendant Twitter, Inc.'s Motion to Dismiss Pursuant to Fed. R. Civ. P. 12(B)(6)," Case No. 2-19-cv-01444-GW (KSx), dated Jun. 25, 2019, 36 pages.
*Blackberry Limited* v. *Twitter, Inc.*, "Twitter's Answer and Defenses to Blackberry's First Amended Complaint and Counterclaims," Case No. 2-19-cv-01444-GW (KSx), filed Oct. 31, 2019, 38 pages.
*Blackberry Limited* v. *Twitter, Inc.*, "Memorandum of Points and Authorities in Support of Defendant Twitter, Inc.'s Motion to Dismiss Pursuant to Fed. R. Civ. P. 12(B)(6)," Case No. 2-19-cv-01444-GW (KSx), dated Jul. 25, 2019, filed May 14, 2019, 30 pages.
*Blackberry Limited* v. *Twitter, Inc.*, "Blackberry Limited's Complaint for Patent Infringement," Case No. 2:19-cv-1444, dated Feb. 27, 2019, 98 pages.
*Blackberry Limited* v. *Twitter, Inc.*, "Blackberry Limited's Opposition to Twitter, Inc.'s Motion to Dismiss," Case No. 2-19-CV-01444-GW (KSx), filed Jul. 24, 2019, 36 pages.
*Blackberry Limited* v. *Twitter, Inc.*, "Appendix A," Case No. 2-19-CV-01444-GW (KSx), filed Jul. 24, 2019, 7 pages.
Cyrusoft International, Inc., "Getting Started Guide—Mulberry IMAP Internet Mail Client Verson 2.1." Internet Document, 2001, pp. 1-36, XP002278985.
Gini Courter et al.; "Mastering Microsoft Office 2003 for Business Professionals", Published by John Wiley and Sons, Feb. 6, 2004, ISBN 0782142281, 695 pages; http://books.google.com/books?id=VHPfK9CH8-sC; pp. 7, 28 and 38.
GMX, "GMX Handbuch," May 2003 (May 2003), Metys Veriag GmbH, Germany, XP002279699.

Microsoft Corporation, Microsoft Outlook 2000, 1999, Microsoft Corporation, Outlook main page.
Microsoft Office Outlook 2003 application, part of Microsoft Office Professional Edition 2003.
R. Cowart, "Mastering Windows 95." 1995, Sybex, p. 571.
Slovak; "Sending and Receiving E-mail in Office 2003"; Nov. 7, 2003; http://www.quepublishing.com/articles/article.aspx?p=101721.
IBM Corp.; "Lotus Notes 7 Help"; Jul. 26, 2005; http://hubert-schmid.de/help/help7_client.nsf/Main?OpenFrameset.
Office Action in Canadian Patent Application 2,498,082, dated Mar. 23, 2010, counterpart of U.S. Appl. No. 10/785,340, 4 pages.
Office Action issued by Canadian Intellectual Property Office dated Aug. 5, 2011 for corresponding Canadian Patent No. 2,572,423, 3 pages.
Office Action issued by the Canadian Intellectual Property Office dated Apr. 20, 2011 for Canadian Patent Application No. 2,498,082, 4 pages.
Office Action issued by the Canadian Intellectual Property Office dated Apr. 23, 2012 for Canadian Patent Application No. 2,498,082, 4 pages.
Office Action issued by the Canadian Intellectual Property Office dated Jun. 11, 2009 for corresponding Canadian Patent Application No. 2,572,423.
Office Action issued by the Canadian Intellectual Property Office dated Mar. 9, 2010 for corresponding Canadian Patent Application No. 2,572,423.
Office Communication issued from the Canadian Intellectual Property Office in corresponding Canadian Application No. 2,572,423, dated Jul. 30, 2013, 4 pages.
Office Communication issued from the Canadian Intellectual Property Office in corresponding Canadian Application No. 2,572,423, dated Jun. 13, 2014, 3 pages.
Office Action issued in Canadian Application No. 2,572,423 dated Nov. 20, 2015.
Office Action issued in Canadian Application No. 2572423 dated Nov. 16, 2016.
Office Action issued in Canadian Application No. 2,572,423 dated Oct. 19, 2017; 3 pages.
European Search Report issued in European Application No. 05113104.3 dated May 8, 2006; 10 pages.
Office Action issued in European Application No. 05113104.3 dated Apr. 5, 2011, 7 pages.
Summons to attend oral proceedings pursuant to Rule 115(1) EPC issued in European Application No. 05113104.3 dated Jul. 28.
Brief Communication regarding Oral Proceedings issued in European Application No. 05113104.3 dated Dec. 7, 2016.
Decision to Refuse a European Patent Application issued in European Application No. 05113104.3 dated Feb. 13, 2017.
*Blackberry Limited* v. *Twitter, Inc.*, "Civil Minuts: In Chambers—final Ruling on Defendant Twitter, Inc.'s Motion to Dismiss Pursuant to Fed. R. Civ.P 12(B)(6)," Case No. 2-19-cv-01444-GW (KSx), dated Oct. 1, 2019, 15 pages.

* cited by examiner

REPRESENTING NEW MESSAGES ON A COMMUNICATION DEVICE

CROSS-REFERENCE TO RELATED APPLICATIONS

This application is a continuation of U.S. patent application Ser. No. 13/466,786, filed May 8, 2012, which is a continuation of U.S. patent Ser. No. 11/320,980, filed Dec. 30, 2005, and issued as U.S. Pat. No. 8,286,089, which are incorporated herein by reference.

A portion of the disclosure of this patent document contains material that is subject to copyright protection. The copyright owner has no objection to the facsimile reproduction by any one of the patent document or patent disclosure, as it appears in the Patent and Trademark Office patent file or records, but otherwise reserves all copyright rights whatsoever.

FIELD

This application relates to the field of data communication, and more specifically, to representing new email messages received on a communication device such as the graphical user interface of a wireless mobile device or a desktop computer.

BACKGROUND

Wireless and mobile communication devices, such as cellular phones, personal digital assistants and the like, include microprocessors, input devices including a keypad, special function buttons and wheels, output devices, information storage capabilities, and run one or more software applications. Examples of software applications used in these wireless mobile devices include micro-browsers, address books, and email clients. Additionally, current generations of such devices have access to a plurality of services via the Internet. A wireless mobile device may, for example, be used to browse web sites on the Internet, to transmit and receive graphics, and to execute streaming audio and/or video applications.

Sending and receiving data messages, particularly email, on wireless mobile devices has become an increasingly important feature. Email messages received by the device are typically viewed using a graphical user interface (GUI), accessing a messages screen displayed on the device's display. Messages are typically presented in a message list showing limited information pertaining to each message such a sender, subject and/or time received. An individual message may be selected and opened to view its contents. A respective icon may be presented in association with each individual message in the message list indicating whether the particular message has been opened or is unopened. When an unopened message is opened, the unopened icon is replaced by an opened icon. Opened/unopened status may also be indicated by bolding, highlighting or other means. A counter indicating the number of unopened messages present on the device may be displayed to the user such as on a home screen of the device.

Many device users receive far too many email messages for a simple unopened counter to be of much use. The number of unopened emails becomes so large that the count itself is largely irrelevant. These users need some way to be informed that they have new messages as distinct from unopened messages on the device.

A solution to one or more of these issues is therefore desirable.

BRIEF DESCRIPTION OF THE DRAWINGS

Further features and advantages of the embodiments will become apparent from the following detailed description, taken in combination with the appended drawings, in which.

It will be noted that throughout the appended drawings, like features are identified by like reference numerals.

DETAILED DESCRIPTION OF EMBODIMENTS

According to one aspect, there is provided a method of representing new email messages on a communication device having a display, such as a mobile wireless communication device or a desktop computer. This method comprises: setting a new message flag when an email message is received by the device; and displaying a new message indicator on the display when the new message flag is set. The new message indicator can be displayed in a home screen displayed on the display.

A computer readable memory having recorded thereon instructions to carry out this method can also be provided, as well as a device comprising such memory.

The method can further comprise one or more of the following steps: unsetting the new message flag when a messages screen is selected on the device; unsetting the new message flag when the email message is opened on the device; and, updating an unopened message counter when the email message is received unopened. The method can further comprise assigning a new and unopened state to the email message when the email message is received unopened, and assigning a new and opened state to the email message when the email message is received opened. The state of each email message assigned the new and unopened state can be changed to old and unopened and each email message assigned the new and opened state can be changed to old and opened when the messages screen is selected on the device. Alternatively, the state of an email message assigned the new and unopened state can be changed to old and unopened when this email message is displayed on the messages screen, and the state an email message assigned the new and opened state can be changed to old and opened when this email message is displayed on the messages screen.

When the device receives a change in opened state of at least one received email message assigned the new and unopened state, the state of this email message can be changed to old and opened.

When opening an email message assigned the new and unopened state or new and opened state or old and unopened state, the state of this email message can be changed to old and opened. In such case, the new message flag can be unset when no received email message is assigned the new and opened or new and unopened states. Further, when a selected time period has elapsed, the state of an email message assigned the new and opened state can be changed to old and opened or the state of an email message assigned the new and unopened state can be changed to old and unopened.

The new message flag can be a new messages counter and the flag be set when the counter is not zero and unset when the counter is zero. In such case, the new messages counter can be updated when the state of any email message has changed from new to old or old to new or when the email message received by the device is assigned a new and opened or new and unopened state.

FIGS. 1-6B illustrate representative embodiments for representing new email messages on a communication device. In accordance with some embodiments, a new message indicator is operable to provide a general indicator of new message activity without operating at an individual message level to distinguish individual messages while other embodiments show how the state of each email may be maintained such that new message indicators may be more granular.

Figure 6A:
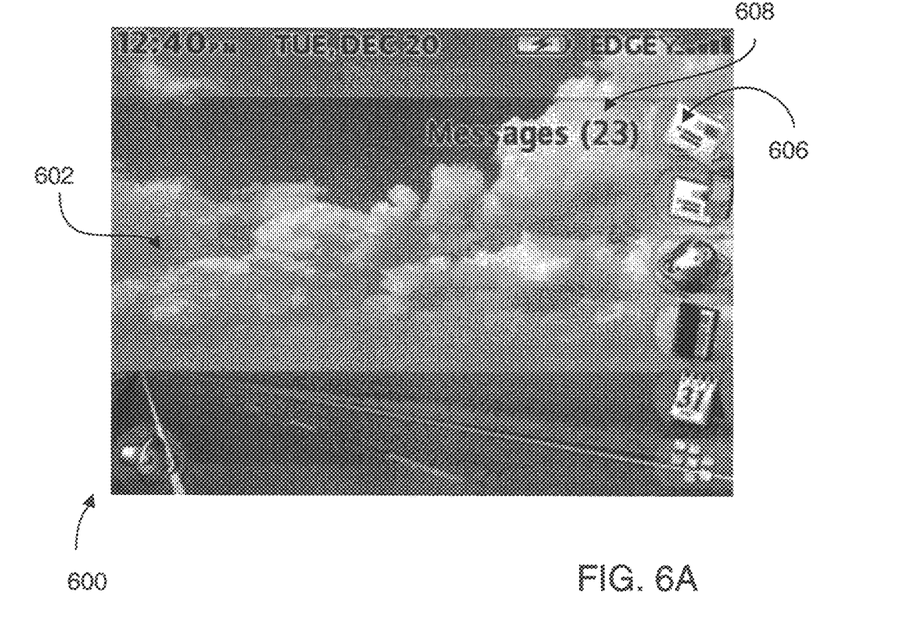
FIGS. 6A and 6B are representative screen shots of a home screen for display by a communication device for representing new email messages.
Figure 6B:
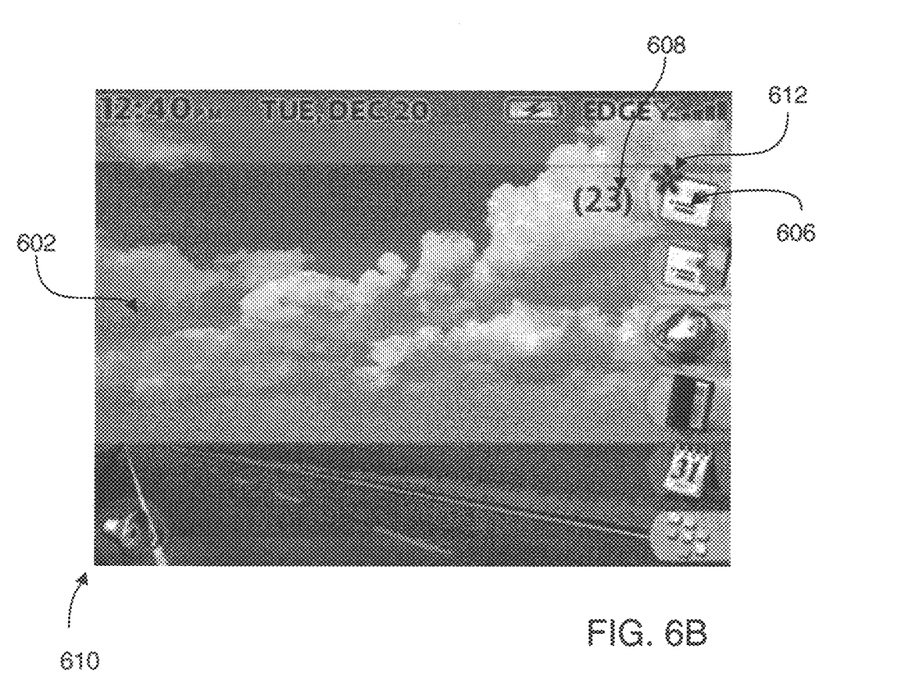

Thus, with reference to FIGS. 6A and 6B, there are shown representative screen shots 600 and 610 according to one embodiment for representing new email messages to a user of a communication device. A new messages indicator 612 is shown on a home screen 602 of a communication device (e.g. 202 or 208 of FIG. 2) when a new email message is present on the device, and is not shown 606 when there are no new messages present on the device. Alternatively or additionally, the new messages indicator can be a light emitting diode (LED) on the device (not shown) that is activated when a new message is present on the device. A new message can be defined as a message that is recently received by the device. A new message indicator may be represented to the user upon the occurrence of the receipt of a new message and such representation stopped upon the occurrence of one or more events such as the invocation of a display screen for viewing messages or the expiry of a predetermined amount of time since the last new message was received. More refined methods for managing new messages are described herein below. A count of individual new messages may be maintained, for example to present to a user, and individual new messages may be distinguished in a message list such as by highlighting, associating with a new message icon or grouping.

In one embodiment, when there is a new message received by the device, the device turns on a new message flag. When the new message flag is on, the new messages indicator (e.g. 612 or LED) may be displayed. The new message flag can be turned off such as when the messages screen for displaying the message list is invoked or, in other embodiments, when all individual new messages are determined to be old messages.

To distinguish new messages from others, individual email messages may be associated to one of a plurality of states. For example, an email may be new having been recently received by the device, or old such as by having been received for longer than a minimum period of time or because a user has or is presumed to have become aware of the message. An email may also be unopened because the contents have not been opened or opened because the contents were opened. Emails may be marked opened even if unopened for viewing or marked unopened even if previously they were opened. As well, In accordance with rules or other filtering activities, a device can receive email in an opened or unopened state. Thus, an individual email may be assigned to one of a plurality of email states to indicate new, old, opened and unopened status.

Figure 1:
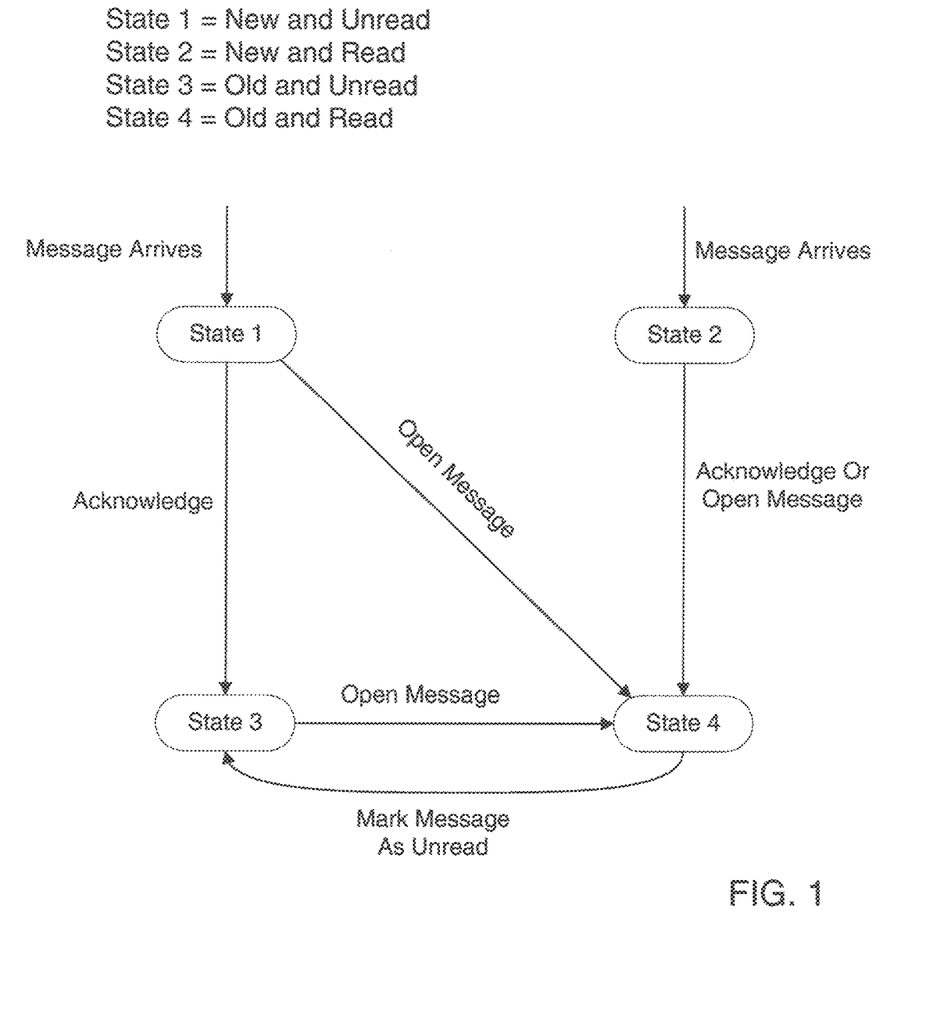
FIG. 1 is a state diagram of different states of email messages received on a communication device.

Referring to FIG. 1, all new unopened messages received by the device may be assigned a "new and unopened" state (State 1) and all new opened messages received by the device can be assigned a "new and opened" state (State 2). When a State 1 or a State 2 message is opened, its state is changed to "old and opened" (State 4). When a messages screen presenting an interface for displaying and navigating messages is invoked or a new message is acknowledged in another way, the state of any State 1 message is changed to "old and unopened" (State 3), and the state of any State 2 message is changed to State 4. When a State 3 message is opened, its state changes to State 4. An old and opened message may be marked as unopened by the user, in which case the message state is changed from State 4 to State 3.

A "new messages" counter (not shown) can be maintained and displayed on the device to shows the number of messages having a State 1 or State 2 state.

Figure 2:
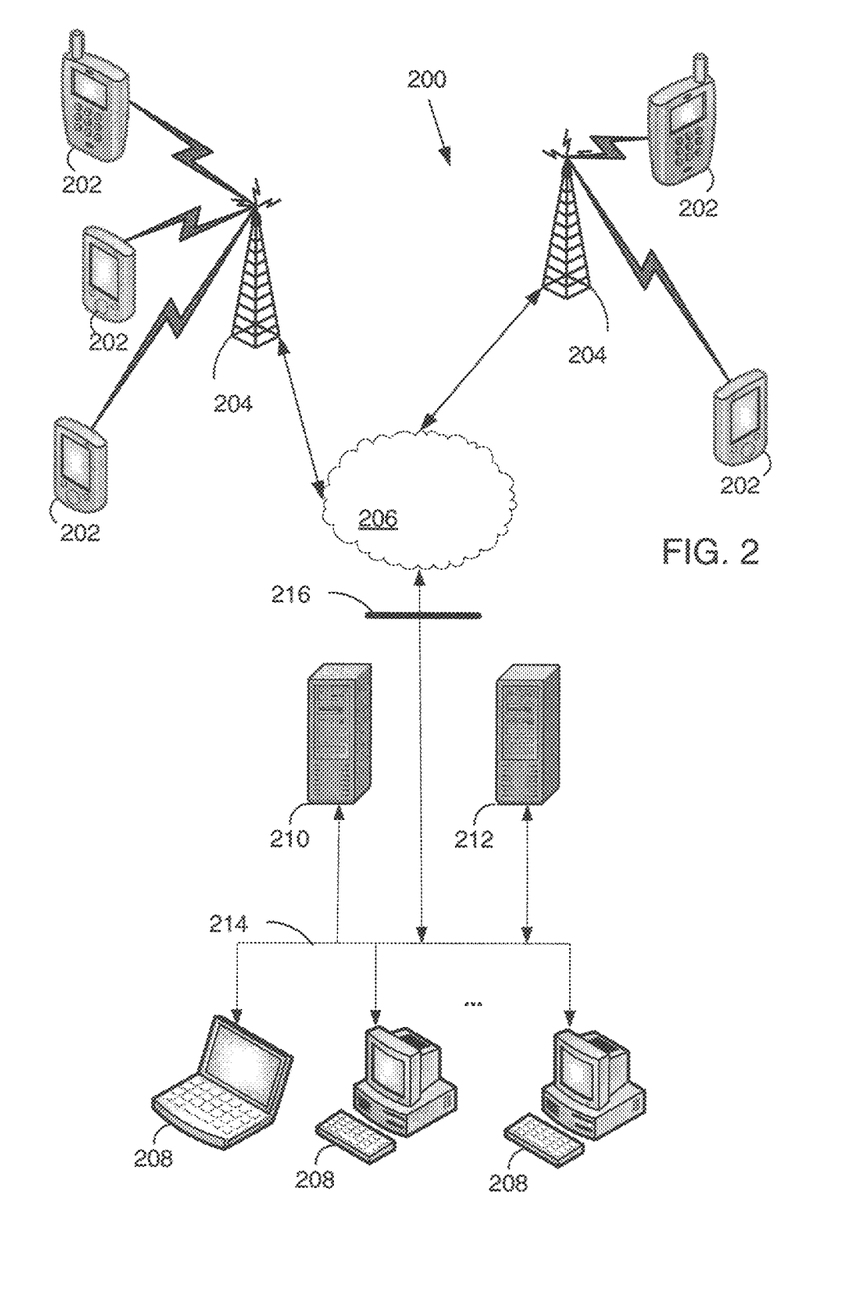
FIG. 2 is a block diagram of a system of communication devices coupled via wired and wireless networks for communicating email in accordance with an embodiment.

FIG. 2 illustrates a representative system 200 of communication devices for communicating email that may be adapted in accordance herewith. System 200 comprises a plurality of wireless communication devices 202 in communication via wireless communications network 204, public network 206 (e.g. the Internet) and local network 214 to an email server 210 of an enterprise assisted by an associated enterprise server 212 for facilitating communications to the wireless devices 202. The enterprise servers (210, 212) are coupled via the local network 214 (which may be wired and/or wireless) for communication with desktop (or laptop) computers 208 comprising email clients for communicating email. Network 214 is coupled to the public network 206 typically behind a firewall 216.

It is understood that at least some of the users of computers 208 may also be users of devices 202 such that the enterprise servers (210, 212) cooperate to synchronize email messages between the wireless device and desktop clients of such users. Thus a wireless device 202 may receive email messages and other data messages providing synchronisation (sync) data with which to synchronize the wireless device to data on the corresponding computer 208 (or server 210). Such data communications, including sync data communications, may be received over-the-air (OTA) and preferably in accordance with a push protocol which may be facilitated by enterprise server 212. The wireless device may also be adapted to send sync data OTA for updating the user's data for computer 208.

Persons of ordinary skill in the art will appreciate that other communication devices may be coupled to the system 200 such as other computers or wireless devices for communicating email (within or without the illustrated enterprise context), wireless network infrastructure to support communications to the wireless devices, spam filtering servers, web servers, etc.

Figure 3:
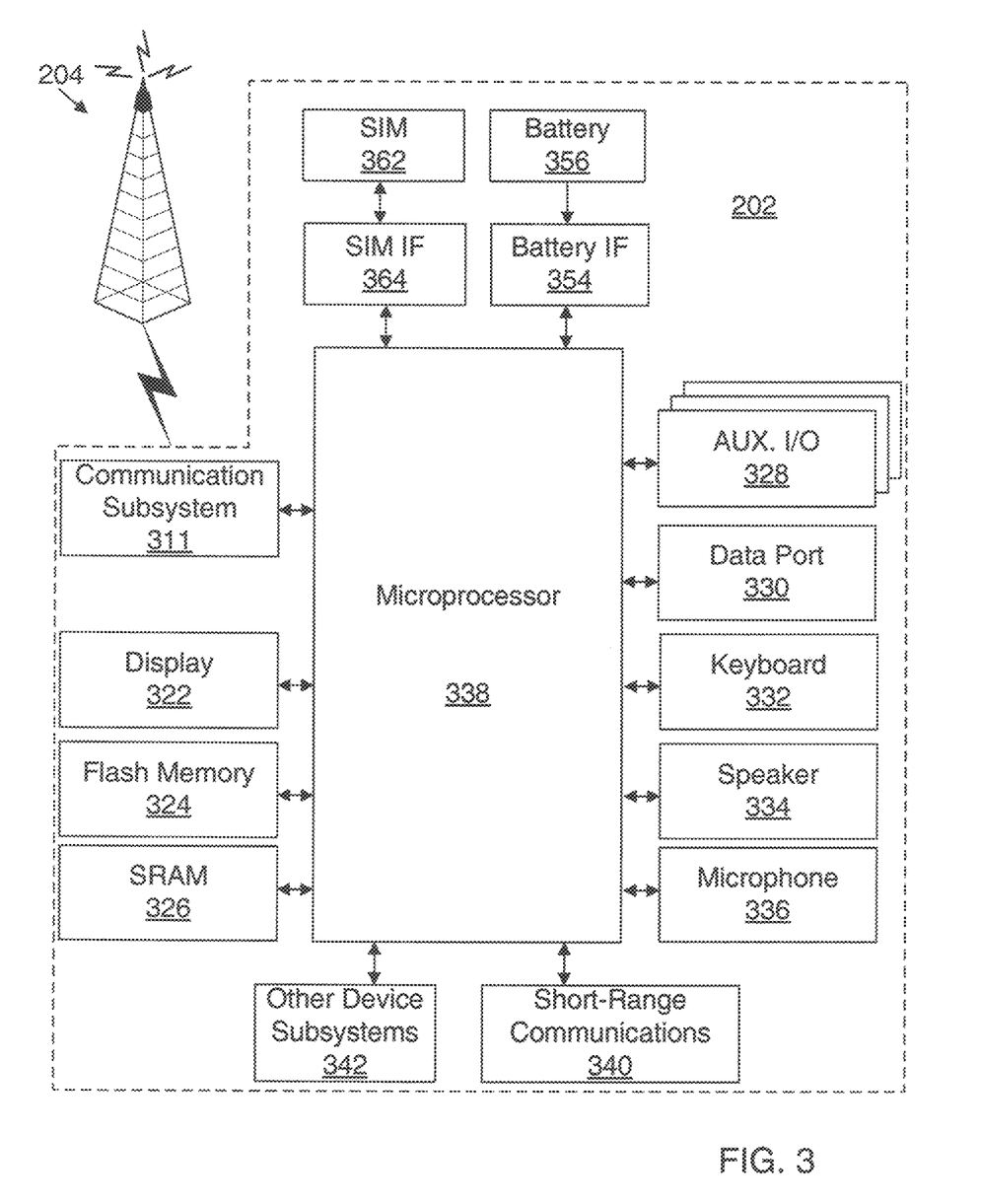
FIG. 3 is a block diagram of a wireless communication device in accordance with an embodiment adapted to represent new messages received on the device.

One example of a wireless device 202 adapted to represent new messages is shown in FIG. 3. Device 202 is a two-way communication device having at least voice and advanced data communication capabilities, including the capability to communicate with other computer systems. Depending on the functionality provided by device 202, it may be referred to as a data messaging device, a two-way pager, a cellular telephone with data messaging capabilities, a wireless Internet appliance, or a data communication device (with or without telephony capabilities). Device 202 may communicate with any one of a plurality of fixed transceiver stations 204 within its geographic coverage area.

Device 202 will normally incorporate a communication subsystem 311, which includes a receiver, a transmitter, and associated components, such as one or more (preferably embedded or internal) antenna elements and, local oscillators (LOs), and a processing module such as a digital signal processor (DSP) (all not shown). As will be apparent to those skilled in field of communications, particular design of communication subsystem 311 depends on the communication network in which device 202 is intended to operate.

Network access is associated with a subscriber or user of device 202 and therefore device 202 requires a Subscriber Identity Module or "SIM" card 362 to be inserted in a SIM IF 364 in order to operate in the network. Device 202 is a battery-powered device so it also includes a battery IF 354 for receiving one or more rechargeable batteries 356. Such a battery 356 provides electrical power to most if not all electrical circuitry in device 202, and battery IF 354 provides for a mechanical and electrical connection for it. The battery IF 354 is coupled to a regulator (not shown) that provides power V+to all of the circuitry.

Device 202 includes a microprocessor 338 that controls overall operation of device 202. Communication functions, including at least data and voice communications, are performed through communication subsystem 311. Microprocessor 338 also interacts with additional device subsystems such as a display 322, a flash memory 324 or other persistent store, a random access memory (RAM) 326, auxiliary input/output (I/O) subsystems 328, a serial port 330, a keyboard 332, a speaker 334, a microphone 336, a short-range communications subsystem 340, and any other device subsystems generally designated at 342. Some of the subsystems shown in FIG. 3 perform communication-related functions, whereas other subsystems may provide "resident" or on-device functions. Notably, some subsystems, such as keyboard 332 and display 322, for example, may be used for both communication-related functions, such as entering a text message for transmission over a communication network, and device-resident functions such as a calculator or task list. Operating system software used by microprocessor 338 is preferably stored in a persistent store such as flash memory 324, which may alternatively be a read-only memory (ROM) or similar storage element (not shown). Those skilled in the art will appreciate that the operating system, specific device applications, or parts thereof, may be temporarily loaded into a volatile store such as RAM 326.

Microprocessor 338, in addition to its operating system functions, preferably enables execution of software applications on device 202. A predetermined set of applications that control basic device operations, including at least data and voice communication applications, will normally be installed on device 202 during its manufacture. A preferred application that may be loaded onto device 202 may be a personal information manager (PIM) application having the ability to organize and manage data items relating to the user such as, but not limited to, instant messaging (IM), e-mail, calendar events, voice mails, appointments, and task items. Naturally, one or more memory stores are available on device 202 and SIM 362 to facilitate storage of PIM data items and other information.

The PIM application preferably has the ability to send and receive data items such as email messages via the wireless network. In a preferred embodiment, PIM data items are seamlessly integrated, synchronized, and updated via the wireless network, with the mobile station user's corresponding data items stored and/or associated with a host computer system thereby creating a mirrored host computer on device 202 with respect to such items. This is especially advantageous where the host computer system is the mobile station user's office computer system. Additional applications may also be loaded onto device 202 through network (204), an auxiliary I/O subsystem 328, serial port 330, short-range communications subsystem 340, or any other suitable subsystem 342, and installed by a user in RAM 326 or preferably a non-volatile store (not shown) for execution by microprocessor 338. Such flexibility in application installation increases the functionality of device 202 and may provide enhanced on-device functions, communication-related functions, or both. For example, secure communication applications may enable electronic commerce functions and other such financial transactions to be performed using device 202.

In a data communication mode, a received signal such as a text message, an e-mail message, or web page download will be processed by communication subsystem 111 and input to microprocessor 338. Microprocessor 338 will preferably further process the signal for output to display 322 and/or to auxiliary I/O device 328. A user of device 202 may also compose data items, such as e-mail messages, for example, using keyboard 332 in conjunction with display 322 and possibly auxiliary I/O device 328. Keyboard 332 is preferably a complete alphanumeric keyboard and/or telephone-type keypad. These composed items may be transmitted over a communication network through communication subsystem 311 or short-range communication subsystem 340.

For voice communications, the overall operation of device 202 is substantially similar, except that the received signals would be output to speaker 334 and signals for transmission would be generated by microphone 336. Alternative voice or audio I/O subsystems, such as a voice message recording subsystem, may also be implemented on device 202. Although voice or audio signal output is preferably accomplished primarily through speaker 334, display 322 may also be used to provide an indication of the identity of a calling party, duration of a voice call, or other voice call related information, as some examples.

Data port 330 in FIG. 3 is normally implemented in a personal digital assistant (PDA)-type communication device for which synchronization with a user's desktop computer is a desirable, albeit optional, component. The data port can be serial or USB. The data port 330 enables a user to set preferences through an external device or software application and extends the capabilities of device 202 by providing for information or software downloads to device 202 other than through a wireless communication network. The alternate download path may, for example, be used to load an encryption key onto device 202 through a direct and thus reliable and trusted connection to thereby provide secure device communication.

Short-range communications subsystem 340 of FIG. 3 is an additional optional component that provides for communication between device 202 and different systems or devices, which need not necessarily be similar devices. For example, subsystem 140 may include an infrared device and associated circuits and components, or a Bluetooth™ communication module to provide for communication with similarly enabled systems and devices. Bluetooth™ is a registered trademark of Bluetooth SIG, Inc.

Figure 4A:
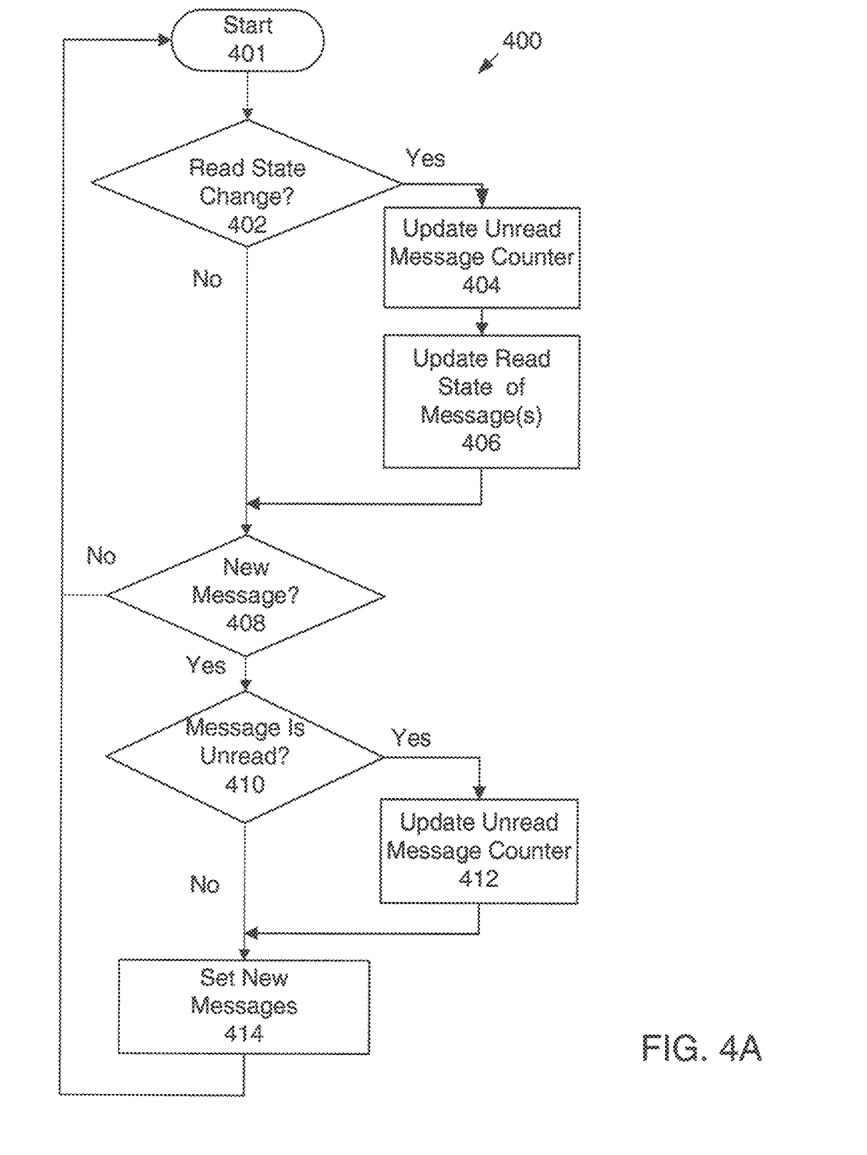
FIGS. 4A and 4B are flowcharts of operations for representing new email messages received on a communication device in accordance with a first embodiment.

Referring now to FIG. 4A there is shown operations 400 for representing new email messages in accordance with a first embodiment. Such operations may be implemented using software. For example, the persistent memory 324 may store thereon a program containing instructions executable by the microprocessor 338 to carry out a method of representing new messages on the display 322. This program can be integrated with the device's operating system software (not shown). The program starts at Step 401 such as upon receipt of one or more data communications from server 212. At Step 402, operations check whether the device 202 has received a sync data item that is an instruction to change the opened state of one or more specified messages already present on the device 202. If such a data item is received, then an unopened message counter is updated by the number of messages which have changed opened states (Step 404) and the specified message(s)' opened states are updated (Step 406). For example, if five messages on the device 202 are marked as unopened and the user opens the corresponding messages on the mirrored host computer system, a synchronization action will cause data items to be delivered to the device 202 that include instructions to change the opened state of the five messages on the device 202 from "unopened" to "opened". The unopened message counter then subtracts its count by five, and the opened states of these five messages are changed from "unopened" to "opened".

From Step 402 or 406, operations continue to check whether any of the data items received are new email messages (Step 408). If there are no new email messages received, the program returns back to its Start state (Step 401) or may end (not shown). If a new message has been received, the program checks whether the new message is marked "opened" or "unopened" (Step 410). For every new message marked "unopened", the program updates the unopened message counter (Step 412). For every new message received, whether opened or unopened, the program turns on a new message flag (Step 414), and returns to its Start state (Step 200).

Optionally, though not shown, a count of new messages may be maintained. For example an operation to count a new message may be performed with operations 408-414.

Figure 4B:
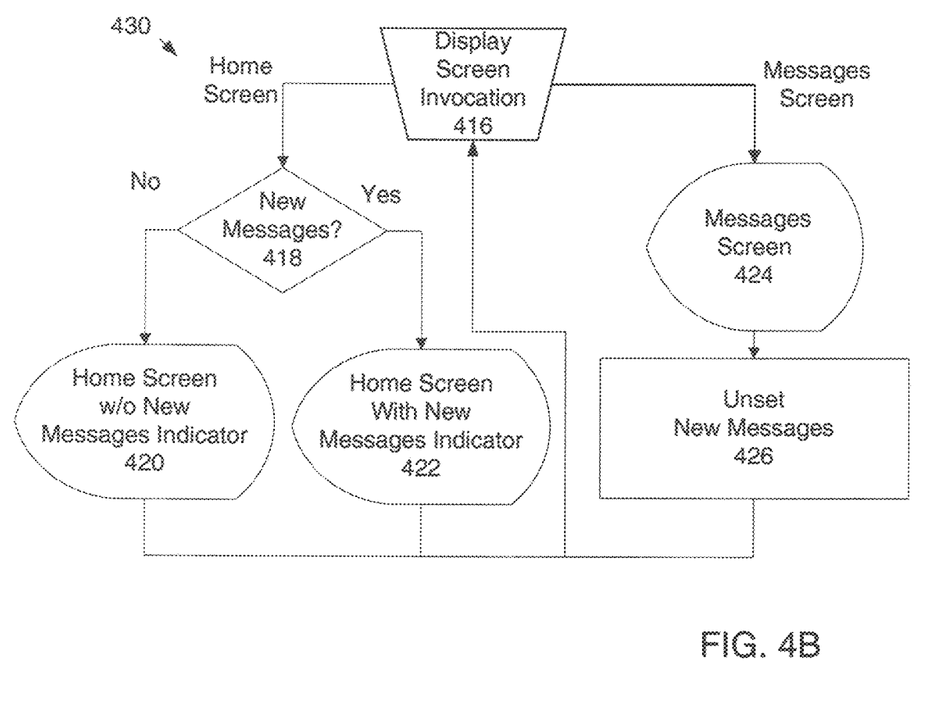

Referring now to FIG. 4B there is shown a flowchart or operations 430 for representing new email messages in accordance with the first embodiment. Display screen activity of the GUI is described for representing the new message indicator (e.g. 612). In accordance with the GUI, the user may navigate about a plurality of screens for example, moving from a home or main screen to display screens of various applications or functions such as an address book, messages screen displaying a list of email messages, calendar, phone dialer, Web browser, etc. Display screens may be invoked for display from the home screen or from other application screens as is well known. FIG. 4B illustrates representative display screen invocation operations and is not exhaustive.

From Step 416, a display screen is invoked. Two alternatives are shown, namely the invocation of the home screen (602) and a messages screen (not shown) for reviewing email messages and opening (reading) email for example. In accordance with the present embodiment, a new message indicator is displayable on the home screen when new messages have been received. New messages indicator is displayable until the messages screen is invoked. Thus the invocation of the messages screen is a proxy for the user's awareness of the new messages. Thus, at Step 418, the new messages flag is examined and in response, the home screen is displayed accordingly without the new messages indicator (Step 420) or with such an indicator Step 422). Operations may continue at Step 416.

From Step 416, when the messages screen is invoked (such as by user selection), the messages screen is displayed (Step 424) and operations unset (e.g. turn off) the message indicator flag (Step 426). When the home screen 602 is accessed again before a new message arrives on the device 202, the home screen 602 will not display the new messages indicator 612.

If a new messages counter is maintained, such may be reset upon invocation of the messages screen (operations 424-426). As well, the home screen 602 may display (optionally a selectable feature) a count of unopened and/or new messages.

In addition to or as an alternative to the illustrated operations for unsetting the new messages flag, the flag may be unset if a new message has not been received within a predetermined period (not shown). A timer may be employed counting down (or up) the period since the receipt of a new message. Upon expiry, the new messages flag may be unset. Should a new message be received (e.g. Step 408), such operations may be adapted to reset the time to start counting again thus maintaining the new messages flag set. Other alternatives to counting may be used such as determining the time of receipt of the last new message and comparing to a current time to the last receipt time. If a threshold difference period is met, the new messages flag may be unset. The period for maintaining the new message indicator is preferably user configurable.

Figure 5A:
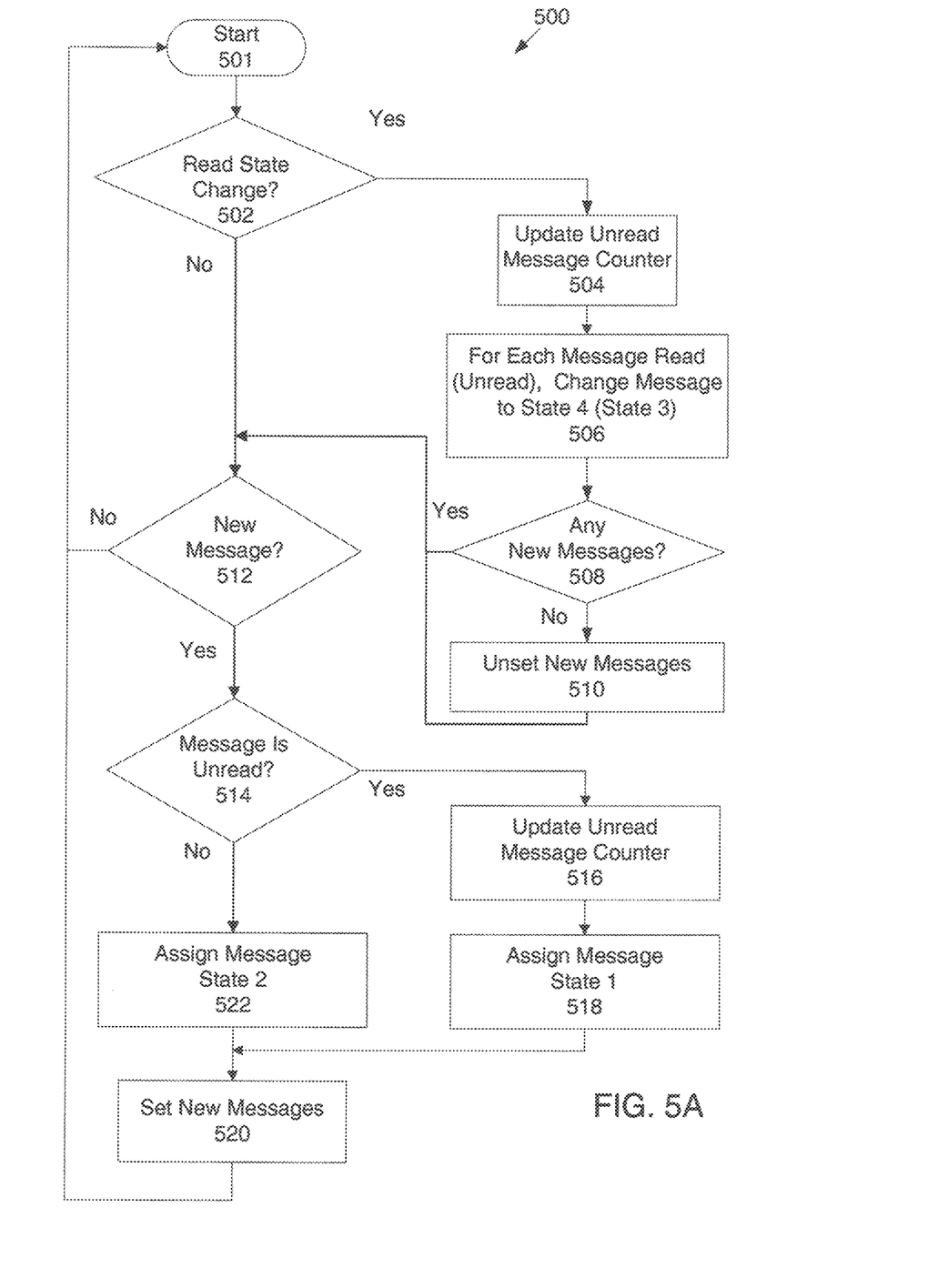
FIGS. 5A-5D are flowcharts of operations for representing new email messages received on a communication device in accordance with a second embodiment.

Referring now to FIG. 5A and according to a second embodiment, a more sophisticated version of the program assigns a state to each message, in addition to generally maintaining a new messages indicator. The assignable states comprise the four states shown in FIG. 1, i.e. new and unopened (State 1), new and opened (State 2), old and unopened (State 3), and old and opened (State 4).

Operations 500 begin at start 502 and check whether the device 202 has received a data item that is an instruction to change the opened state of one or more specified messages already present on the device 202 (Step 502). If such a data item is received, then the unopened message counter is updated by the number of messages which have changed opened states (Step 504) and the specified message(s)' opened states are updated (Step 506). If the data item includes instructions to change a opened state from "unopened" to "opened" for a specified State 1 message, the program changes that specified message to State 4. If the data items include instructions to change a opened state from "unopened" to "opened" for a specified State 3 message, the program changes that specified message to State 4. Conversely, if the data item includes instructions to change a opened state of a specified State 2 or State 4 message from "opened" to "unopened" (e.g. when a user has marked an opened message as unopened on the host desktop computer), the program will change the specified message's state accordingly (State 3).

At Step 508, operations check whether there are any State 1 or State 2 messages remaining on the device 202, i.e. whether there are any new messages. If there are no new messages remaining on the device, the new messages flag is unset (Step 510) and operations continue at Step 512.

At Step 512, if there are no new messages received, the program returns back to its Start state. If a new message has been received, there is a check whether the new message is marked "opened" or "unopened" (Step 514). For every new message marked "unopened", the program updates the unopened message counter (Step 516) and assigns a State 1 state to the message (Step 518). For every new message marked "opened", the program assigns a State 2 state to the message (Step 522). For every new message received, whether opened or unopened, the program turns on the new message flag (Step 520), and returns to its Start state (Step 200).

Optionally, operations 500 may maintain a new messages counter as discussed with respect to the first embodiment.

Figure 5B:
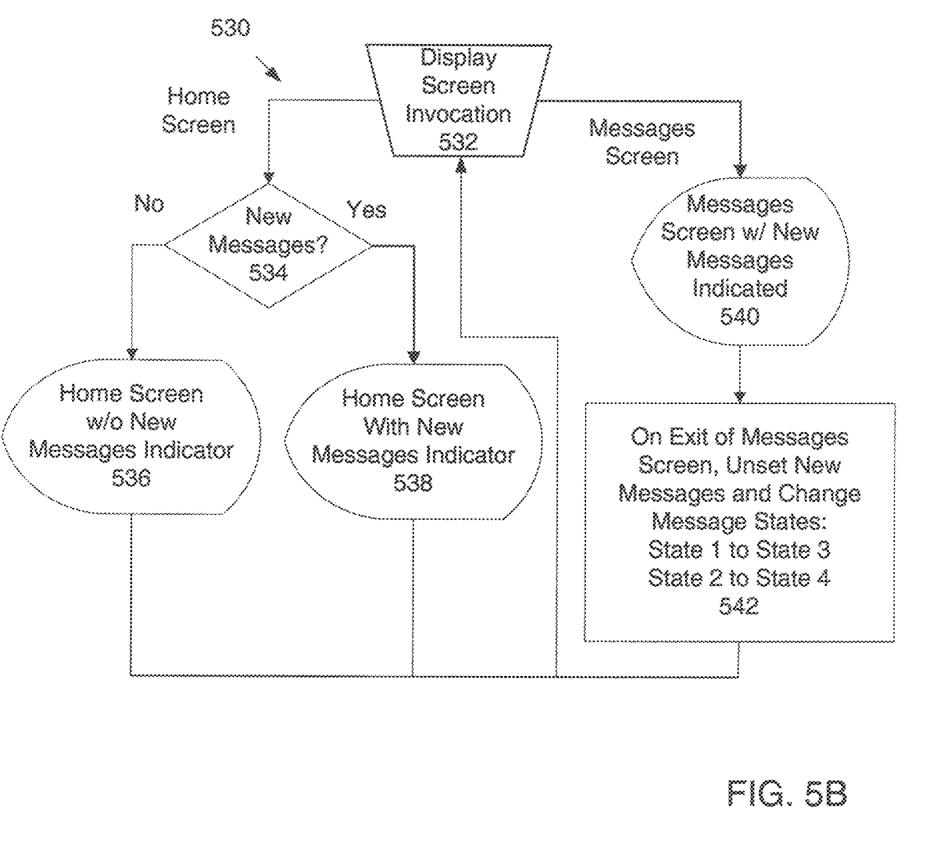

Referring now to FIG. 5B, operations 530 are similar to operations 430. Display screen invocation Step 532 branches to display the home screen via steps 534-538 showing the new messages indicator in response to the new messages flag. Step 532 also branches to display the messages list screen but with new messages indicated at the message level. In response to the message state, highlighting, icon selection, colour selection or other manners may be used to distinguish new messages from others in the message list. New messages may also be grouped in a portion of the message list (e.g. the top) and moved to the portion show the other messages when no longer new. A simple approach to unsetting the new messages flag is shown (Step 542) whereby on exit of the messages screen, new messages are transitioned to appropriate states 3 or 4 and the flag is unset. Though not shown, a new message count may be reset as well. A timer expiry mechanism may also be employed (not shown) as discussed in the first embodiment.

Figure 5C:
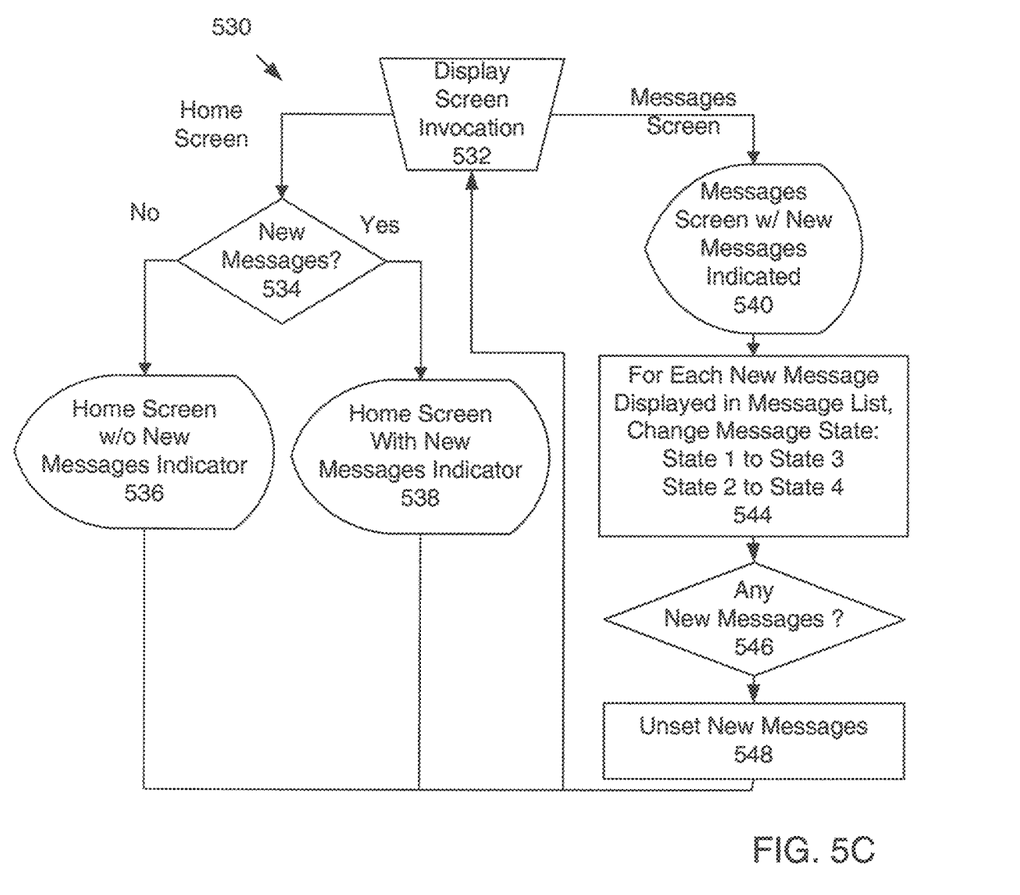

Referring now to FIG. 5C a more sophisticated approach to determining new messages on the device 202 is provided that is particularly useful for devices will small displays. For such devices, the entire message list often cannot be displayed on the display at one time. The user can scroll through the message list to bring into view message headings on the list that were not previously displayed. Instead of turning off the new message flag in response to the invocation of the messages screen as a general proxy of user awareness, the device 202 in this approach will only turn off the new message flag when all the new messages on the device 202 have been displayed in the message list on the device display 322. Operations 530 in this embodiment are like operations of the embodiment of FIG. 5B with the exception of steps 544-546. At step 540, the messages screen is displayed and any State 1 or State 2 messages displayed on the display 322 are marked to stand out from other messages in the message list, e.g. by an icon beside the message heading, etc. When a State 1 or State 2 message is displayed on the display 322 (or following a small delay or on exit of the messages screen), operations 530 change the state of the displayed State 1 messages to State 3, and the state of displayed State 2 messages to State 4 (Step 544). At step 546, operations determine if there are any new messages left on the device 202, i.e. whether any messages is assigned a State 1 or State 2 state. If no, then the program turns off the new messages flag (Step 548). Again, a new messages counter may be maintained in conjunction with step 544 which may be useful at step 546. The timer mechanism may also supplement this embodiment.

Figure 5D:
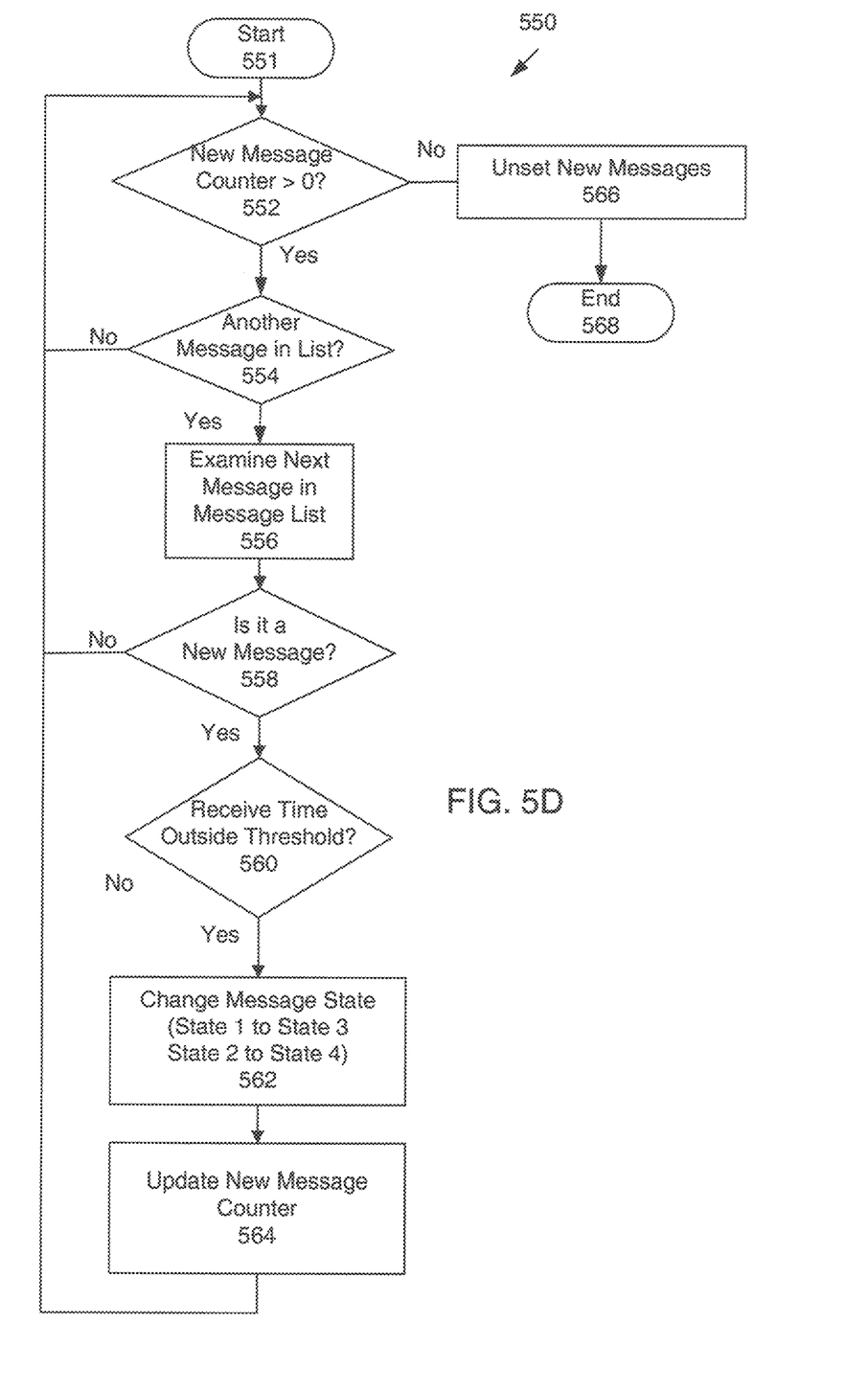

Referring now to FIG. 5D, a timer mechanism embodiment is described whereby for each new message in the message list, a determination is made whether to treat the individual new message as an old message and changing its state accordingly, due to a lapse of time since it was received. This embodiment assumes a new message counter is maintained when new messages are received. The embodiment of FIG. 5D may be useful with other embodiments shown or described as well. Alternatively, this timer mechanism can be operated in a global state. When a new message arrives, the timer mechanism is reset. When this timer mechanism elapses, the new messages flag is unset.

Operations start (Step 551) and examine if there are any new messages (counter>0). If yes, is there a next message in the message list to examine (Step 554). If available, a next message is examined to determine its message state and time of receipt. If it is a new message (State 1 or 2) and its receipt time is outside the threshold period (current time−receipt time>period), then the individual message is considered old and its state changed accordingly Step 562). The new message counter is updated (Step 564). Operations may then repeat. Operations may similarly repeat for any next messages from Steps 554, 558 or 560 accordingly. Thus individual new messages may be aged. The new messages indicator may be displayed (Steps 534-538) in response to the aging.

Though described with reference primarily to operations of a wireless mobile device, persons of ordinary skill in the art will understand that operations for representing new received messages described above can also be applied to a desktop environment. For example, the new messages indicator can be displayed on a task bar or in a pop up window of a GUI for a desktop computer monitor, and the new messages flag can be turned off, or the new messages counter can be updated when the email client GUI of a desktop computer is activated. A client email program can be adapted to assign (or assign) server 210) to assign the same four states to messages received by the desktop.

While various preferred embodiments of the invention have been illustrated and described, it will be appreciated that various changes can be made therein without departing from the scope and spirit. For example, persons of ordinary skill in the art will appreciate that if a new messages counter is employed, a new messages flag may be redundant and omitted. The new messages indicator may be displayed (or not) in response to the count of such messages.

What is claimed is:

1. A method, comprising:
receiving, at a device, an electronic message;
in response to receiving the electronic message, updating a new message counter;
displaying a new message indicator on a user interface of the device in response to the new message counter being greater than zero;
in response to determining that a duration between a current time and a time when the electronic message was received at the device exceeds a threshold, decreasing the new message counter at the device without the electronic message having been opened;
in response to the new message counter being zero, removing the new message indicator from the user interface;
receiving, at the device, a second electronic message;
displaying a second new message indicator on the user interface;
receiving an invocation to display a message display screen for viewing a listing of a plurality of electronic messages including the second electronic message; and
in response to the invocation to display the message display screen, displaying the message display screen and removing the second new message indicator without opening the second electronic message or receiving user input on the message display screen.

2. The method of claim 1, further comprising:
in response to determining that the duration between the current time and the time when the electronic message was received at the device exceeds the threshold, changing a state of the electronic message from new to old.

3. The method of claim 1, further comprising:
receiving, at the device, a third electronic message;
displaying a third new message indicator on the user interface; and
in response to determining a duration in which no new message has been received since the third electronic message exceeding a second threshold, removing the third new message indicator from the user interface.

4. The method of claim 1, wherein the user interface is a home screen displayed on the device.

5. A device, comprising:
a memory; and
at least one hardware processor communicatively coupled with the memory and configured to:
receive an electronic message;
in response to receiving the electronic message, update a new message counter;
display a new message indicator on a user interface of the device in response to the new message counter being greater than zero;
in response to a determination that a duration between a current time and a time when the electronic message was received at the device exceeds a threshold, decrease the new message counter at the device without the electronic message having been opened;
in response to the new message counter being zero, remove the new message indicator from the user interface;
receive a second electronic message;
display a second new message indicator on the user interface;
receive an invocation to display a message display screen for viewing a listing of a plurality of electronic messages including the second electronic message; and
in response to the invocation to display the message display screen, display the message display screen and remove the second new message indicator without opening the second electronic message or receiving user input on the message display screen.

6. The device of claim 5, wherein the at least one hardware processor is further configured to:
in response to determining that the duration between the current time and the time when the electronic message was received at the device exceeds the threshold, change a state of the electronic message from new to old.

7. The device of claim 5, wherein the at least one hardware processor is further configured to:
receive a third electronic message;
display a third new message indicator on the user interface; and
in response to a determination that a duration in which no new message has been received since the third electronic message exceeding a second threshold, remove the third new message indicator from the user interface.

8. The device of claim 5, wherein the user interface is a home screen displayed on the device.

9. A non-transitory computer-readable medium containing instructions which, when executed, cause a device to perform operations comprising:
receiving, at the device, an electronic message;
in response to receiving the electronic message, updating a new message counter;
displaying a new message indicator on a user interface of the device in response to the new message counter being greater than zero;
in response to determining that a duration between a current time and a time when the electronic message was received at the device exceeds a threshold, decreasing the new message counter at the device without the electronic message having been opened;
in response to the new message counter being zero, removing the new message indicator from the user interface;
receiving, at the device, a second electronic message;
displaying a second new message indicator on the user interface;
receiving an invocation to display a message display screen for viewing a listing of a plurality of electronic messages including the second electronic message; and
in response to the invocation to display the message display screen, displaying the message display screen and removing the second new message indicator without opening the second electronic message or receiving user input on the message display screen.

10. The non-transitory computer-readable medium of claim 9, wherein the operations further comprise:
in response to determining that the duration between the current time and the time when the electronic message was received at the device exceeds the threshold, changing a state of the electronic message from new to old.

11. The non-transitory computer-readable medium of claim 9, wherein the operations further comprise:
receiving, at the device, a third electronic message;
displaying a third new message indicator on the user interface; and
in response to determining a duration in which no new message has been received since the third electronic message exceeding a second threshold, removing the third new message indicator from the user interface.

* * * * *